United States Patent

Chen

[15] 3,641,510

[45] Feb. 8, 1972

[54] BEAM ADDRESSABLE MASS STORAGE USING THIN FILM WITH BISTABLE ELECTRICAL CONDUCTIVITY

[72] Inventor: Arthur C. M. Chen, Schenectady, N.Y.

[73] Assignee: General Electric Company

[22] Filed: Jan. 2, 1970

[21] Appl. No.: 145

[52] U.S. Cl. ..................340/173 CR, 340/173 LM, 328/124

[51] Int. Cl. ..........................................................G11c 11/42

[58] Field of Search .................340/173 CR, 173 LM, 173 R; 328/124

[56] References Cited

UNITED STATES PATENTS

| | | | |
|---|---|---|---|
| 2,901,662 | 8/1959 | Nozick | 340/173 |
| 3,363,240 | 1/1968 | Cola | 340/173 |
| 3,488,636 | 1/1970 | Dyck | 340/173 |
| 3,445,715 | 5/1969 | Dombeck | 340/173 |

OTHER PUBLICATIONS

IBM Technical Disclosure Bulletin Vol. 9 no. 5 October 1966 pp. 555-556 "Charge-Storage Beam-Addressed Memory" by W. R. Beam

*Primary Examiner*—Terrell W. Fears
*Attorney*—Richard R. Brainard, Paul A. Frank, John J. Kissane, Frank L. Neuhauser, Oscar B. Waddell and Joseph B. Forman

[57] ABSTRACT

An electron beam addressable mass memory and recording technique is described wherein information is stored by selective electron beam irradiation of bit sites in a target characterized by a thin film of a bistable conductivity material, e.g., an arsenic-tellurium-germanium glass, to switch the electrical resistance of the irradiated sites. The recorded information subsequently is nondestructively read out by impinging a lower intensity electron beam upon each bit site and measuring current flow through the site to a metal substrate juxtaposed with the bistable conductivity film. To erase recorded information, the switch bit site is irradiated with an electron beam having an intensity above the threshold level required to return the site to the original resistance state.

7 Claims, 7 Drawing Figures

Figure 1:
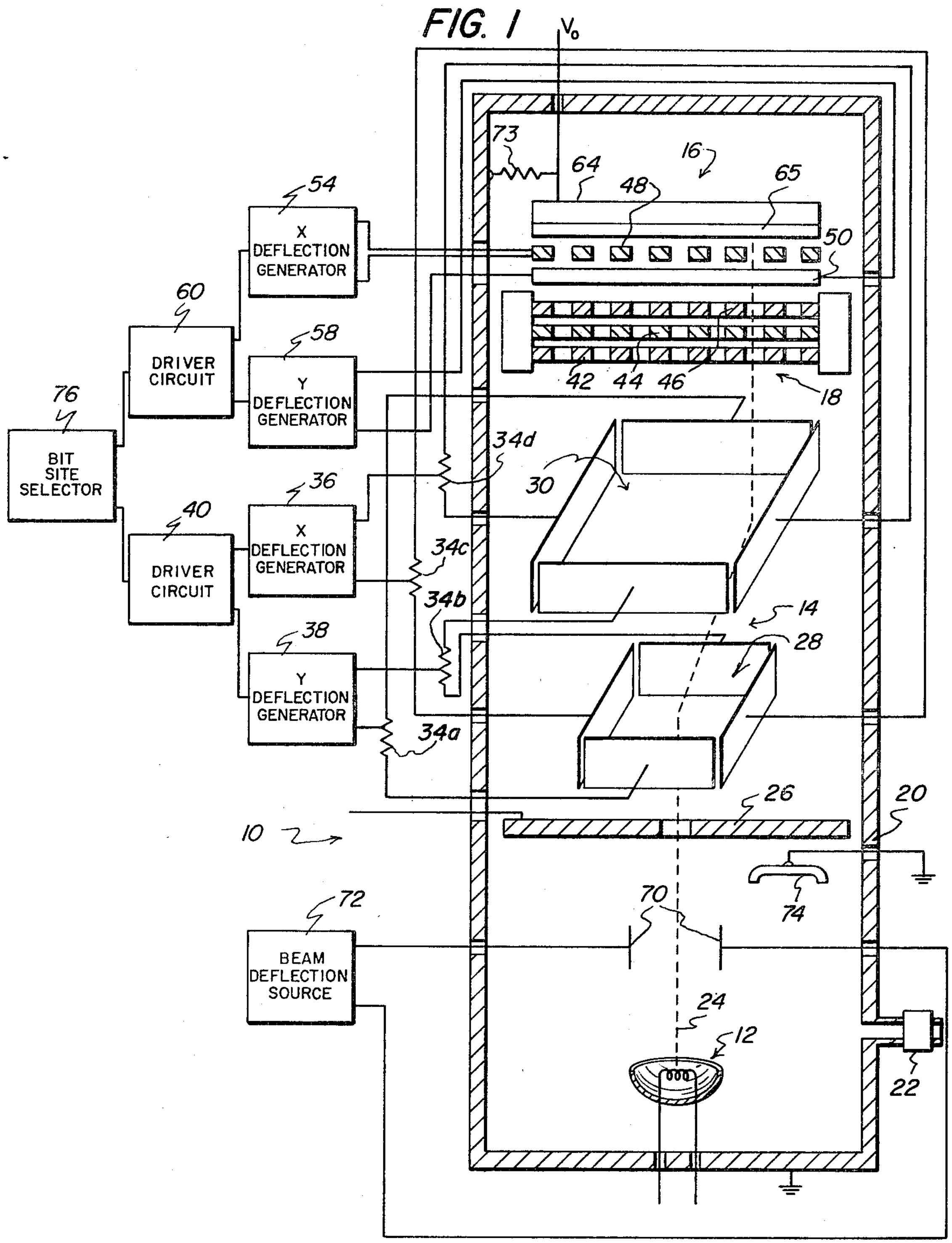

INVENTOR:
ARTHUR C.M. CHEN
by John J. Kessane
HIS ATTORNEY

INVENTOR:
ARTHUR C.M. CHEN
by John J. Kissane
HIS ATTORNEY

INVENTOR:
ARTHUR C.M. CHEN
by John J. Kearns
HIS ATTORNEY

BEAM ADDRESSABLE MASS STORAGE USING THIN FILM WITH BISTABLE ELECTRICAL CONDUCTIVITY

This invention relates to an electron beam mass memory and method of recording. In a more particular aspect, the invention is directed to a method and apparatus for recording information by electron beam irradiation of selective bit sites of a bistable conductivity film to alter the resistivity of the irradiated sites. Information then is nondestructively read out by impinging a lower intensity electron beam upon each bit site and measuring current flow to a conductive substrate juxtaposed with the bistable conductivity film. To erase the stored information, the selected sites are again irradiated with an electron beam of sufficient intensity to reverse the change in resistivity of the thin film.

In recent years, a number of diverse materials having bistable electrical conductivity, i.e., materials having a stable high-resistance state reversibly switchable to a stable low-resistance state in response to an imposed voltage in excess of a given threshold level determined by each material, have been developed for utilization in various circuitry wherein the stable switching characteristics of the material are desired. Although materials such as metal oxides, e.g., niobium pentoxide disposed between niobium and bismuth electrodes, are known to give bistable conductivity characteristics, other bistable conductivity materials generally have taken the form of glassy or noncrystalline semiconductive compounds having compositions such as 50 percent tellurium and 50 percent germanium with and without cesium diffused therein; 50 percent tellurium and 50 percent germanium with a 25 percent solution of vandium pentoxide or with the addition of 10 percent magnetic particles therein; compositions formed from 3.8 grams of tellurium and 2.4 grams of antimony; as well as compositions formed of 50 percent tellurium, 50 percent gallium antimonide; 47 percent tellurium, 47 percent germanium, 5 percent gallium arsenide and 1 percent iron; 90 percent tellurium, 10 percent germanium; 90 percent selenium, 10 percent germanium; arsenic-tellurium-iodine glasses; and stibnite crystals having between 1.0 and 3.5 percent by weight excess antimony.

It also has been proposed, e.g., in an article by C. H. Sie et al. entitled "An Electrically Alternable NDRO Memory Cell Using Bulk Bistable Resistivity in As-Te-Ge Glass" published by the IEEE Solid State Circuit Conference, 1969, that a mass memory be fabricated by disposing an evaporated arsenic-tellurium-germanium glass film between two orthogonal arrays of conductors. To record information at each crossover region, a suitable voltage pulse in excess of the threshold level for the glass film is applied to the orthogonal conductors forming the crossover region to switch the resistive state of the glass film situated between the conductors. Information subsequently is read out of each bit site by a measurement of current flow through a bit site for a fixed voltage applied to the orthogonal conductors forming the bit site. Mass random access memories of this type characteristically however have sneak path noise problems and diodes in series with the bistable conductivity film memory devices at each crossover heretofore have been proposed to eliminate the problem.

I have found, however, that sneak path noise can be substantially eliminated in mass random access memories using a bistable conductivity film overlying a conductive substrate as the memory device by the utilization of an electron beam to switch the resistive state of selected bit sites in a bistable conductivity target. Moreover, the target of this invention requires no etching of orthogonal conductors during fabrication with both the film of bistable conductivity material and the underlying substrate being completely homogeneous.

It is, therefore, an object of this invention to provide a novel random access, read and erasable electron beam addressable mass memory having a target of bistable conductivity material.

It is also an object of this invention to provide a random access mass memory utilizing the switching characteristics of a bistable conductivity material wherein sneak path noise is substantially reduced.

It is a still further object of this invention to provide a novel method of recording and reading out of information by electron beam irradiation of selected bit sites in a homogeneous film of bistable conductivity material.

These and other objects of this invention are achieved in an electron beam addressable mass memory having means for the generation of a focused electron beam and a target characterized by a thin film of bistable conductivity material overlying and in electrical contact with a conductive substrate. Suitable programming means are provided for selectively deflecting the electron beam to diverse sites along the bistable conductivity film to switch the irradiated sites of the film from a first stable resistance level to a second stable resistance level thereby recording information at the irradiated sites and the resistive mode of each site is interrogated by means connected to the conductive substrate to measure current flow through selected sites of the bistable conductivity thin film. Thus to record and read out information in accordance with this invention, an electron beam is generated in sufficient intensity to switch selected bit sites of a thin film of bistable conductivity material from a first resistive state defined by an initial function of current to a second resistive state defined by a different function of current. After electron beam switching of selective sites, an electron beam of lower intensity is subsequently irradiated upon the bit sites of the target to produce a current flow in the conductive substrate proportional to the resistive state of the subsequently irradiated sites.

To erase or to change the stored information, the selected sites are irradiated with an electron beam of sufficient intensity to exceed the threshold current level of the bistable conductivity material thereby returning the site to a first resistive state. Those sites not irradiated retain their stored information and updating of the recorded information can be continuously effected without mass erasure of the target.

Figure 2:
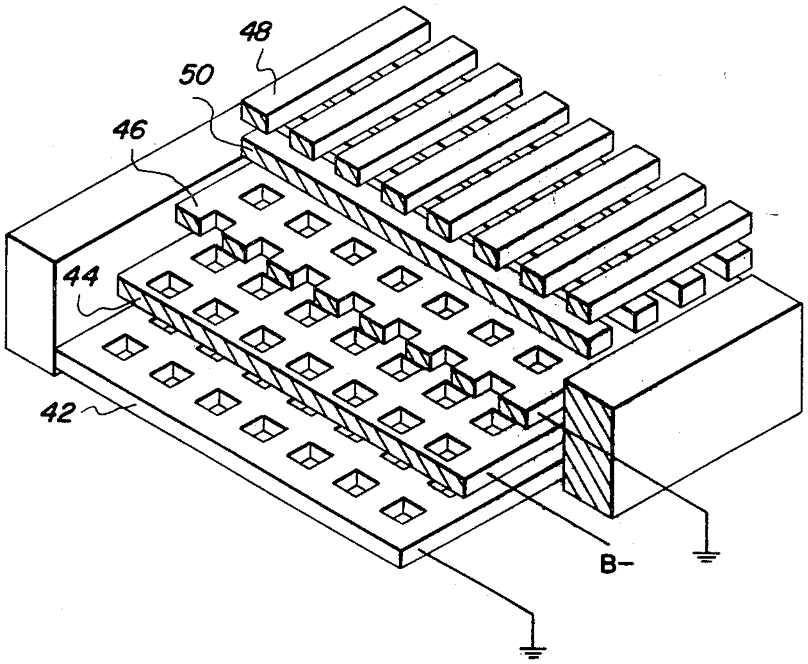
Figure 3:
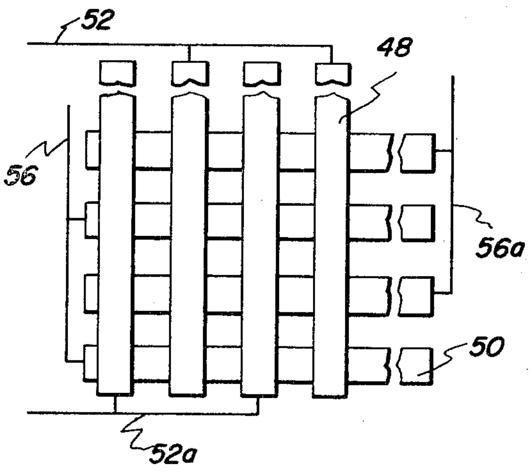
Figure 4:
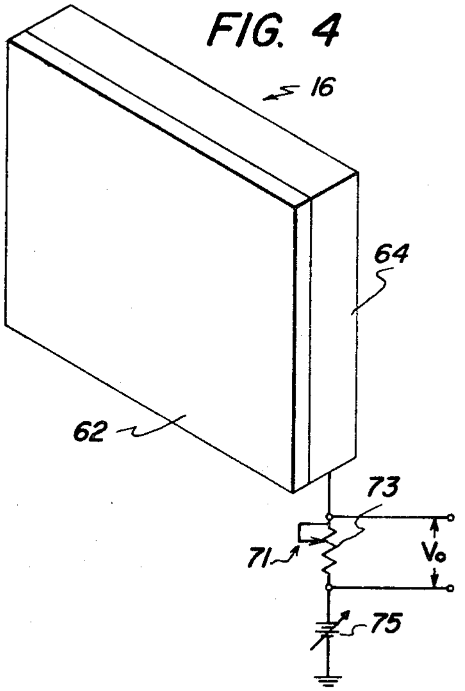
Figure 5:
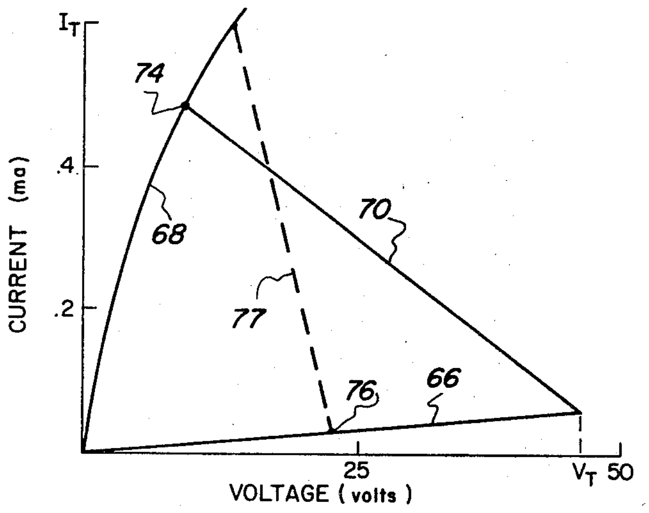
Figure 6:
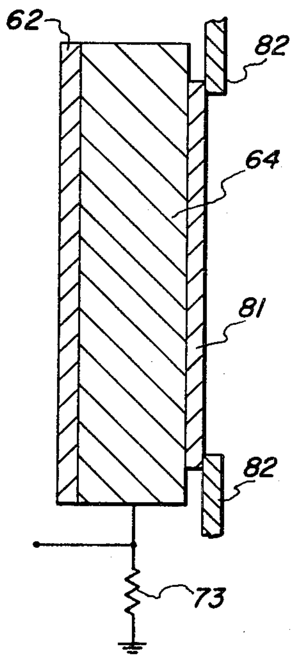
Figure 7:
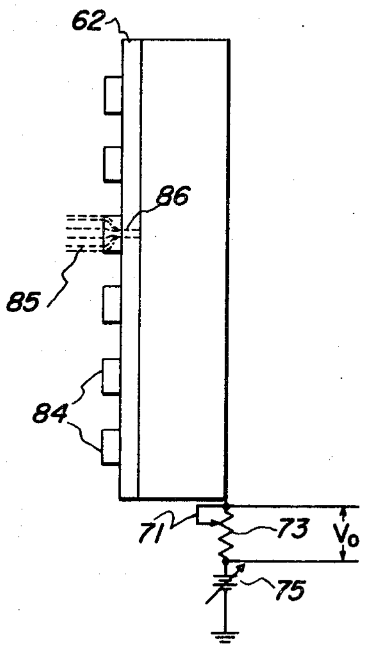

The novel features believed characteristic of the invention are set forth in the appended claims. The invention itself, together with further objects and advantages thereof may best be understood by reference to the following description, taken in connection with the accompanying drawings, in which:

FIG. 1 is a sectionalized plan view of an electron beam mass memory device in accordance with this invention, FIG. 2 is an isometric view of the fine deflection system within FIG. 1, FIG. 3 is a plan view of the deflection conductors of the fine deflection system, FIG. 4 is an isometric view of the target employed with the mass memory of this invention, FIG. 5 is a graphical illustration of the bistable conductivity characteristic of the film forming the memory of this invention, FIG. 6 is a sectional view of an alternate target suitable for use in the electron beam mass memory of this invention, and FIG. 7 is a sectional view of an alternate target for use in the mass memory of this invention.

An electron beam mass memory 10 in accordance with this invention is depicted in FIG. 1 and generally comprises a source 12 for the generation of an electron beam, deflection means generally identified by reference numeral 14 for coarsely registering the generated electron beam upon target 16 and fine deflection means in the form of an electron lens matrix 18 (i.e., an array of lenslets which may be termed a Fly's Eye Lens system) for deflecting the beam to a particular bit site along the closely adjacent target. Impingement of the electron beam upon the bit site of the target alters the electrical resistance of the bistable conductivity film at the irradiated site and readout subsequently is effected by a measurement of current flow through the bit site upon impingement of a lower intensity electron beam thereon. The memory is enclosed within an electrically grounded metallic housing 20 permitting vacuum pump 22 to exhaust the housing to a suitable operating vacuum for the electron beam apparatus, e.g., $10^{-5}$ torr or lower, while serving as an electromagnetic shield for the memory.

Electron beam source 12 desirably is an electron beam gun capable of generating a high current density electron beam 24 and typically may be an electron beam gun of the type shown and described in U.S. Pat. No. 3,008,066, issued in the name of Sterling P. Newberry on Nov. 7, 1961, and assigned to the assignee of the present invention. The electron beam is focused by at least one suitably energized, centrally apertured focusing electrode 26 to produce an electron beam diameter of between 1–2 microns as the beam impinges upon the face of target 16 while collimating the electrons forming the beam along a path perpendicular to the plane of the target.

A first electrostatic deflection unit 28 comprising two pairs of mutually orthogonal deflection plates is disposed intermediate source 12 and target 16 to deflect the electron beam to a registered location relative to a single lenslet of Fly's Eye Lens System 18 whereupon the beam passes through a second electrostatic deflection unit 30 (also formed by two pairs of mutually orthogonal deflection plates) returning the deflected beam to a perpendicular attitude relative to the plane of target 16 before entering the selected lenslet. Each of deflection units 28 and 30 are interconnected through a plurality of potentiometer resistances 34A–34D permitting opposite deflection plates of each deflection unit to receive voltages of the same polarity from X deflection generator 36 and Y deflection generator 38 with the relative amplitude of the voltages applied to the deflection plates being set by the position of the center tap on the potentiometer interconnecting each pair of opposite plates. Interconnection of opposite plates of electrostatic deflection units 28 and 30 causes deflection in opposite directions at each deflection unit so that the electron beam impinges only orthogonally upon the lenslets of Fly's Eye Lens system 18. Typically, X deflection generator 36 and Y deflection generator 38 can be any commercially available controlled voltage source producing a potential across each pair of deflection plates forming deflection unit 28 of, for example, 0–300 volts in 1-volt increments under the control of a suitable course driver circuit 40 to permit random access to any one of a rectangular array of 300 by 300 lenslets of Fly's Eye Lens system 18.

Fly's Eye Lens system 18 depicted in enlarged form in FIGS. 2 and 3 generally comprises three conductive plates 42, 44, and 46 and a plurality of mutually orthogonal deflection bars 48 and 50 with the deflection bars being disposed remotely from electron beam source 12 relative to the conductive plates. Each of plates 42, 44, and 46 contain an identical number of apertures therein arranged in an essentially rectangular array, e.g., an array of 300×300 rectangular apertures per plate, with the apertures of all three plates being registered orthogonally relatively to the plane of the target to pass only electrons disposed at a perpendicular attitude relative to the target. Desirably plates 42 and 46 are at ground potential while intermediate plate 44 is connected to a source of negative potential, $B^-$, of amplitude substantially one-half the amplitude of the potential at electron beam source 12. Thus, each lenslet of the Fly's Eye Lens serves to collimate the electron beam passing therethrough while deflection units 28 and 30 select the particular lenslet of the Fly's Eye Lens through which the beam is to pass.

Immediately following each lenslet is a set of parallel metallic deflection bars 50 followed by a second set of parallel metallic deflection bars 48 directed orthogonally thereto with deflection bars 48 being spaced apart from deflection bars 50 to permit separate electrical energization of the deflection bars. Thus one pair of leads 52 and 52A are respectively connected to one end of alternate ones of deflection bars 48 for the purpose of supplying deflection voltages thereto in an X direction from deflection generator 54 while similar connections are made to one end of alternate ones of Y deflection bars 50 by leads 56 and 56A for the purpose of supplying to the bars beam deflection voltages in the Y direction from deflection generator 58. X deflection generator 54 and Y deflection generator 58 are similar to deflection generators 36 and 38 and typically can be any commercially available controlled voltage source producing a potential across the deflection bars from 0–300 volts in 1-volt increments under the control of driver circuit 60 to permit random access to any one of, for example, a 300 by 300 bit site rectangular array underlying each lenslet. A more complete understanding of the Fly's Eye Lens system can be obtained from an article by S. P. Newberry, entitled, "The Fly's Eye Lens—A Novel Electron Optical Component for Use With Large Capacity Random Access Memories" in Volume 29 of the American Federation of Information Processing Societies, Conference Proceedings published by Spartan Books, Washington, D.C. (Nov. 1966) and in copending U.S. Pat. application Ser. No. 671,353, now U.S. Pat. No. 3,491,236 filed Sept. 28, 1967, in the name of S. P. Newberry and assigned to the assignee of the present invention (both of which disclosures are expressly incorporated herein by reference). While traversal of the electron beam across target 16 for recording and readout purposes is described herein as being accomplished electrostatically, the beam also can be registered at selected sites along the target utilizing electromagnetic means or by mechanical movement of either the target or the electron beam source.

Target 16 for recording information is illustrated in FIG. 4 and generally comprises a thin homogeneous film 62 of a material characterized by a bistable electrical conductivity overlying and in electrical contact with a conductive substrate 64. Film 62 can be any material characterized by the ability to be switched from a first stable resistive state to a second stable resistive state by current flow therethrough in excess of a threshold level determined by the film composition and may be a semiconductive glass such as the arsenic-tellurium-iodine glass described in U.S. Pat. No. 3,117,013, a glass containing approximately 55 atomic percent arsenic, 35 atomic percent tellurium and 15 atomic percent of a semiconductor selected from the group consisting of germanium or silicon, or a stibnite crystal containing between 1.0 and 3.5 percent by weight excess antimony as described in U.S. Pat. No. 2,968,014. Desirably the bistable conductivity film should be characterized by a stable high-resistive state definable by an initial function of current, as exemplified by curve 66 of FIG. 5, and a stable low-resistive state defined by a different function of current, as exemplified by curve 68. Moreover the bistable conductivity film should exhibit a high-to-low resistance ratio of at least $10^3$ for a given readout electron beam current flow to permit the variation in current flow through a bit site as small as 1-micron diameter to clearly distinguish a high-resistance bit site from a bit site in a low-resistance mode.

Bistable conductivity film 62 generally is deposited by vacuum evaporation to form a layer having a thickness between 1,000 A. to 1 micron although other techniques, e.g., flow coating and subsequent whirling of the substrate, also could be utilized to form a bistable conductivity film within the desired thickness range. For the low- and high-resistance states of bit sites in the film to produce readily distinguishable signals, the impedance of the film bit sites should be matched to the input impedance of the beam by a variation of the film thickness in the range between 1,000 A. and 1 micron. Thus for conventional electron beam gun sources having an input impedance of 500 kΩ, the film should be of a thickness dependent upon the film composition to produce a resistance in excess of 500k for a bit site in the high-resistance state.

When the composition employed to form film 62 is an arsenic-tellurium-germanium glass, the chosen ingredients are weighed out in the atomic percent ratio of 55 percent arsenic, 35 percent tellurium and 15 percent germanium and sealed in a quartz vial whereupon the vial is exhausted to a pressure less than 1 micron. After the ingredients within the vial have been melted at 1,000° C. for approximately 1 hour, the melt is quenched by removal of the vial from the furnace to form a solidified glass. Upon cooling, the glass is mechanically broken into small particles and placed in a carbon crucible in an evaporation chamber whereupon the particles are evaporated at a pressure below $1\times10^{-7}$ torr and deposited atop a suitable conductive substrate.

Conductive substrate 64 preferably is a refractory metal such as rhodium or platium although any conductive material, e.g., molybdenum or carbon, also can be employed for the substrate. The substrate also desirably is less than 2 microns in thickness and provides both mechanical support for bistable conductivity film 62 and a conductive path (in conjunction with resistor 73 electrically bonded between the substrate and ground potential) to permit readout of individual bit sites during interrogation of film 62.

For recording, electron beam source 12 is energized to produce a beam of, for example, 0.4 milliamps and the beam initially is deflected by deflection plates 70 energized by a suitable beam deflection voltage source 72 to impinge upon a Faraday cup 74 until recording upon a particular bit site of target 16 is desired. For recording with lower or higher intensity electron beams, bias source 75 can be adjusted to alter the applied voltage across the bistable conductivity film for a fixed intensity electron beam. The desired bit site for recording then is entered into drivers 40 and 60, e.g., by a manual setting of dual-window potentiometers in bit site selector 76, to set the coarse and fine deflection apparatus of the memory. The beam deflection pulse from deflection source 72 then is terminated permitting the beam to enter coarse deflection units 28 and 30 for deflection to a single lenslet of Fly's Eye Lens system 18 as determined by the output voltage signals of X deflection generator 36 and Y deflection generator 38 under the control of driver 40.

Upon entering the selected Fly's Eye Lenslet, the electron beam is again deflected by an X deflection voltage applied to X deflection bars 48 from deflection generator 54 and a Y deflection voltage applied to Y deflection bars 50 from deflection generator 58 to impinge upon a single bit site of, for example, 1 micron diameter along film 62. Upon reaching the switching threshold voltage, $V_t$ identified in FIG. 5, the irradiated bit site switches along load line 70 determined primarily by resistor 73 to a low electrical resistance state (characterized by point 74 of curve 68) and the irradiated bit site continues in the low-resistance state upon termination of electron beam impingement thereof. The output voltages from fine deflection generators 54 and 58 then can be altered to record information upon a second bit site along the portion of the target registered with the lenslet through which the electron beam is passed by deflection units 28 and 30. When those bit sites of the target underlying the lenslet have been recorded by a selective deflection of the beam by deflection bars 48 and 50, the electron beam is deflected by coarse deflection units 28 and 30 to a second lenslet whereat deflection bars 48 and 50 produce a selective irradiation of the underlying bit sites. For high-density recording, each bit site typically is of a cross-sectional area between 1 and 2 microns with the center-to-center spacing between bit sites being 5 microns. Such dimensions can be achieved using a 300 by 300 lenslet rectangular array Fly's Eye Lens system with each lenslet being capable of deflecting the beam to any one of a 300 by 300 rectangular array of bit sites. Desirably, the Fly's Eye Lens system should have at least $10^4$ lenslets to permit the target to be closely spaced to the lenslets thereby increasing the recording accuracy of the system. When recording of information on target 16 is to be supervised by a perforated tape, the recording system of prior cited U.S. Pat. application Ser. No. 671,353, suitably can be employed.

To readout information from the target, the intensity of electron beam 24 is reduced below the threshold level required for switching the resistance of the bistable conductivity film, e.g., by an alteration in the voltage applied to electron beam source 12 or focusing electrode 26, and the beam is selectively irradiated upon various bit sites of the target under the control of coarse deflection means 14 and Fly's Eye Lens system 18 to produce a current flow through bistable conductivity film 62 to the juxtaposed metallic substrate. The voltage drop across resistor 73 is continuously monitored to produce a voltage signal $V_o$ indicative of the resistance of the irradiated bit site.

To erase recorded information from the target, the intensity of the electron beam can be raised to a level sufficiently high to exceed the threshold level, $I_t$, at which the bistable conductivity film reverts to a low-resistance state and the beam is traversed across each resistance bit site to be erased. Erasure of recorded information also can be achieved with an electron beam of lower intensity, e.g., writing intensity or slightly higher, by varying bias source 75 thereby increasing the applied voltage across bistable conductivity film 62 for a fixed-intensity electron beam. During erasure, potentiometer contact 71 suitably also is altered to decrease the resistance of resistor 73 thereby returning the irradiated bit site to a low-resistance state, e.g., point 76, along line 77 of FIG. 5.

When bistable conductivity film 62 is a material, e.g., stibnite crystal or an arsenic-tellurium-silicon glass, capable of returning to a high-resistance state upon the application of heat in excess of 100° C. to the film, the film desirably is deposited atop a metallic substrate 64 having a resistive heater 81 bonded to the substrate face remote from the bistable conductivity film as illustrated in FIG. 6. Complete erasure of information recorded upon film 62 then is accomplished by passing current from leads 82 through heater 81 to raise the substrate to a temperature of approximately 100°–300° C. for a period of 2–3 seconds. The original resistivity of the material is thereupon restored and upon cooling to a normal temperature, information can again be recorded upon the target.

An alternate target for utilization in this invention is depicted in FIG. 7 wherein conductive platelets 84 overlie each bit site of the target to provide flow channels conducting electrons from the reading beam 85 to any region, identified by reference numeral 86, previously transformed to a low-resistance state during recording. The platelets typically may be formed by vacuum evaporating molybondium over bistable conductivity film 62 and photochemically etching the platelets utilizing any commercially available photoresistant and an etchant such as a ferricyanide etch comprising 92 grams potassium ferricyanide and 20 grams potassium bhdroxide in 300 grams water. The conductive platelets thus increase current flow through the low-resistance bit sites of the target relative to targets without conductive platelets thereby increasing the ratio of output signal across resistor 73 for sites with recorded information thereon.

What I claim as new and desire to secure by Letters Patent of the United States is:

1. An electron beam addressable mass memory comprising means for the generation of a focused electron beam, a target characterized by a thin film of a material having a bistable electrical conductivity overlying and in electrical contact with a conductive substrate, programming means for selectively deflecting said electron beam to diverse locations along said thin film, said electron beam switching the irradiated sites of said thin film from a first stable resistance level to a second stable resistance level to record information at said selected sites by the resistance level of said sites and means connected to said conductive substrate to measure current flow through selected sites of said bistable conductivity thin film to interrogate said target.

2. An electron beam addressable mass memory according to claim 1 wherein said first and second resistance levels are defined by diverse functions of current.

3. An electron beam addressable mass memory according to claim 1 wherein the ratio of said first resistance level to said second resistance level is at least equal to $10^3$ for a given electron beam current flow through said material.

4. An electron beam addressable mass memory according to claim 1 wherein said programming means include a plurality of interposed electrostatic lenses arranged in an array disposed in an overlying attitude relative to said bistable conductivity film of said target and deflection means positioned between said electron beam source and said array of electrostatic lenses to direct said electron beam to a single lens forming said array.

5. An electron beam mass memory according to claim 1 wherein said bistable conductivity material is a glass containing arsenic, tellurium and an element selected from the group consisting of germanium and silicon.

6. A method of recording and reading out information upon a target characterized by a thin film of bistable conductivity material overlying a conductive substrate comprising the steps of generating an electron beam of sufficient intensity to switch said thin film material from a first resistive state defined by an initial function of current to a second resistive state defined by a second function of current, selectively programming said electron beam to impinge upon selected bit sites of said bistable conductivity material to switch said material at the irradiated bit sites from said first resistive state to said second resistive state and subsequently applying a lower intensity electron beam to diverse bit sites of said target to produce a current flow in said conductive substrate proportional to the resistive state of the subsequently irradiated sites.

7. A method of recording and reading out information according to claim 6 wherein said selective programming of said electron beam is accomplished by disposing a planar array of electrostatic lenses in an overlying attitude relative to the target to finely focus said electron beam upon said target and deflecting said electron beam intermediate said source and said planar array of lenses to focus said beam upon a single lens of said array.

* * * * *